United States Patent [19]

Chikamori et al.

[11] Patent Number: 4,700,933
[45] Date of Patent: Oct. 20, 1987

[54] SHOCK ABSORBING APPARATUS FOR AN ENGINE

[75] Inventors: Sunao Chikamori, Nagoya; Hideyuki Iwata, Okazaki, both of Japan

[73] Assignee: Mitsubishi Jidosha Kogyo Kabushiki Kaisha, Tokyo, Japan

[21] Appl. No.: 881,564

[22] Filed: Jul. 3, 1986

Related U.S. Application Data

[63] Continuation of Ser. No. 587,523, Mar. 8, 1984, abandoned.

[30] Foreign Application Priority Data

Mar. 15, 1983 [JP] Japan .................................. 58-36222

[51] Int. Cl.⁴ .......................... F16F 9/34; F16F 13/00
[52] U.S. Cl. ................................ 267/140.1; 180/300; 248/550; 248/566; 248/636; 251/207; 251/209; 280/707; 280/710; 280/714
[58] Field of Search ............................ 267/104.1, 8 R; 180/300, 312, 902; 280/707, 710, 714; 251/207, 209; 248/550, 566, 636, 659; 188/285, 299, 319

[56] References Cited

U.S. PATENT DOCUMENTS

| 1,023,104 | 4/1912 | Carpenter | 251/207 X |
| 2,417,096 | 3/1947 | Thiry | 267/140.1 |
| 2,421,585 | 6/1947 | Thiry | 267/140.1 |
| 2,705,118 | 3/1955 | Beck | 267/140.1 X |
| 2,730,356 | 1/1956 | Hunter | 267/141 X |
| 3,037,574 | 6/1962 | Clerk | 180/70.1 |
| 3,559,776 | 2/1971 | Schultze | 188/299 |
| 4,010,930 | 3/1977 | Sands | 251/209 X |
| 4,164,274 | 8/1979 | Schupner | 188/285 |
| 4,199,128 | 4/1980 | Boom et al. | 267/140.1 X |
| 4,325,541 | 4/1982 | Korosladanyi et al. | 267/8 R |
| 4,352,487 | 10/1982 | Shtarkman | 267/140.1 X |
| 4,416,445 | 11/1983 | Coad | 267/140.1 X |
| 4,420,060 | 12/1983 | Kakimoto | 267/140.1 |

FOREIGN PATENT DOCUMENTS

| 2916616 | 11/1980 | Fed. Rep. of Germany | 180/300 |
| 54247 | 3/1983 | Japan | 267/140.1 |
| 199220 | 11/1983 | Japan | 180/300 |

Primary Examiner—George E. A. Halvosa
Attorney, Agent, or Firm—Birch, Stewart, Kolasch & Birch

[57] ABSTRACT

A casing accommodating a liquid is divided by a partitioning member into two sections. The partitioning member is secured to either an engine or vehicle body, and the walls of the two sections facing the partitioning member are secured to the enging or vehicle body, to which the partitioning member is not secured. The partitioning member is provided with an orifice mechanism which can vary the state of communication between the two sections. When the engine is going to roll, the orifice mechanism is controlled to restrict the communication between the two sections to increase the damping force, whereby the rolling of the engine is prevented.

7 Claims, 19 Drawing Figures

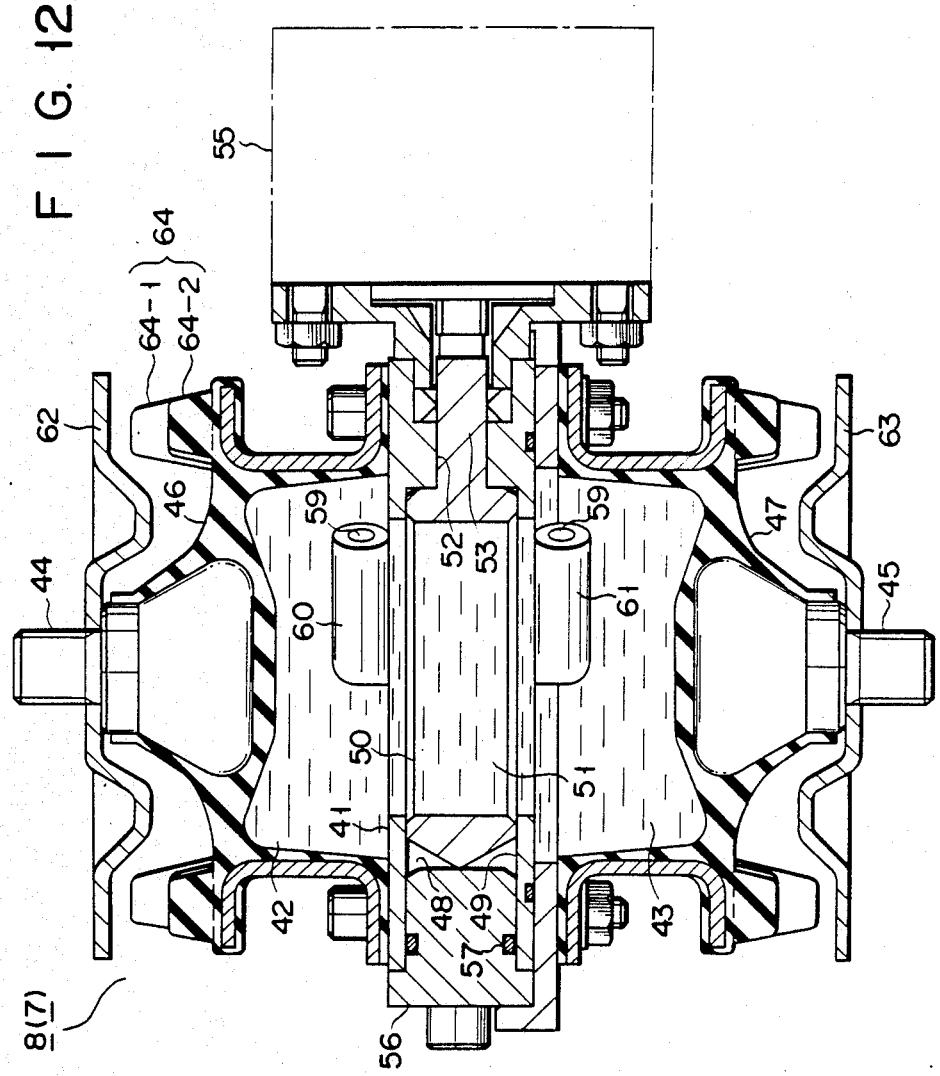

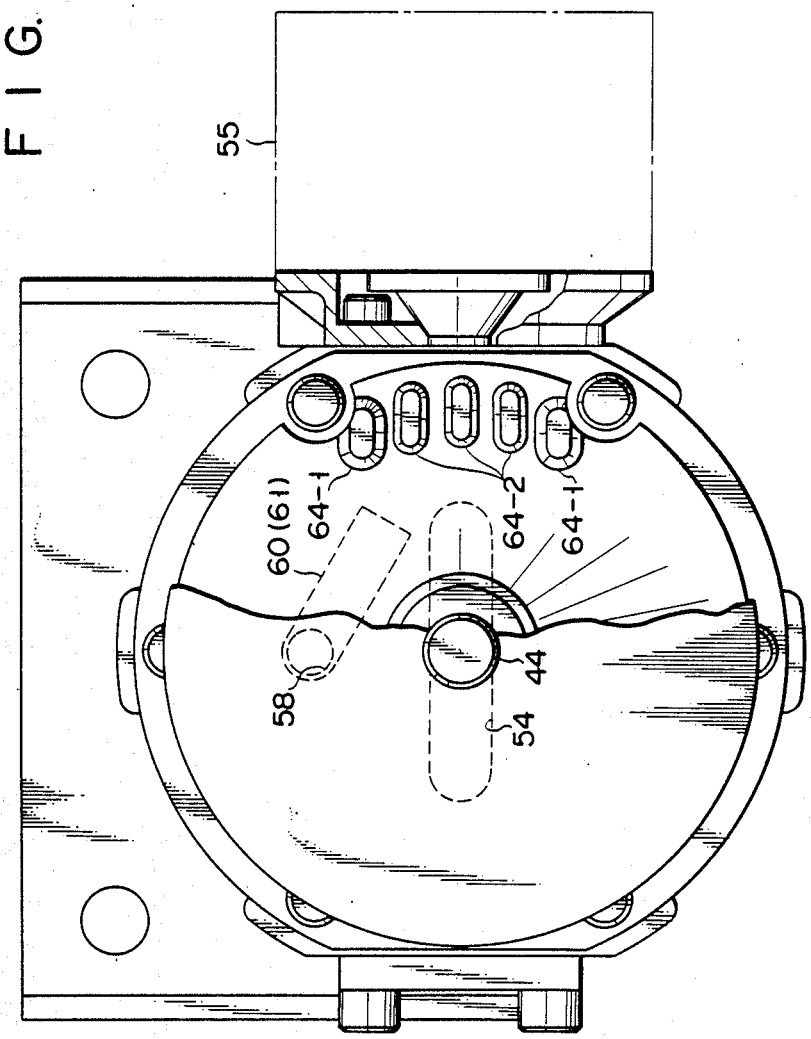

SHOCK ABSORBING APPARATUS FOR AN ENGINE

This application is a continuation of application Ser. No. 587,523, filed on Mar. 8, 1984, and now abandoned.

BACKGROUND OF THE INVENTION

This invention relates to a shock absorbing apparatus for suppressing the rolling of an automobile engine.

Recently, automatic transmission vehicles have become prevalent. In a vehicle of this type, torques, generated by the power device, differ in an idling or steady drive state and an automatic gear changing state of the automatic transmission. In the idling of steady drive state, a high-frequency and small-magnitude signal is generated, so that a low torque is generated from the power device. However, in the automatic gear changing state, a low-frequency and large-magnitude signal is generated, so that a high torque is generated.

In a vehicle generating different torques, shock absorbing members, as shown in FIG. 1, having a nonlinear spring characteristic are conventionally disposed between the engine and vehicle body, so as to decrease transmission of the torque (vibration) to the body frame and provide a comfortable drive. The shock absorbing member has an inner cylinder a and an outer cylinder b, as shown in FIG. 2. A rubber plate c is disposed to couple the inner cylinder a and the outer cylinder b. The inner cylinder a is fixed on the engine, and the outer cylinder b is fixed on the body frame, so that the rubber plate c absorbs the shock. However, in a large engine which generates a large torque, the vibration or shock cannot be absorbed by only the rubber plate c. When an automatic gear change occurs, shock occurs. In order to absorb such a shock, as shown in FIG. 3, liquid chambers f and g are formed by upper and lower mount rubber members d and e. An orifice h is formed between the liquid chambers f and g. A portion i is fixed on the body frame and a portion j is mounted on the engine. The shock is absorbed by utilizing a damping force generated when the liquid passes through the orifice h. When vibration having a large magnitude occurs, the damping force occurs by an action between the liquid and the orifice h. However, when a small shock or displacement occurs, the liquid does not pass through the orifice h due to the resistance of the orifice h. Therefore, a spring constant is increased, and a transfer force of the shock is increased, resulting in inconvenience.

SUMMARY OF THE INVENTION

An object of the invention relates to provide a shock absorbing apparatus for an engine, which can control the rolling of the engine by varying the damping force according to the magnitude of the reaction against the engine torque.

According to the invention, there is provided a shock absorbing apparatus for an engine comprising a casing accommodating a liquid, a partitioning member secured to either the engine or a vehicle body and dividing the interior of the casing into two sections, mounting means for securing the walls of the two sections facing the partitioning member to either the engine or vehicle body, to which the partitioning member is not secured, orifice means provided on the partitioning member, for varying the state of communication between the two sections, driving means for driving the orifice means, and control means for operating the driving means by detecting that the engine is going to roll.

BRIEF DESCRIPTION OF THE DRAWINGS

FIG. 12 is a sectional view showing another embodiment of the shock absorbing apparatus according to the invention;

FIG. 13 is a plan view showing a further embodiment of the shock absorbing apparatus according to the invention;

DETAILED DESCRIPTION OF THE PREFERRED EMBODIMENT

Figure 1:
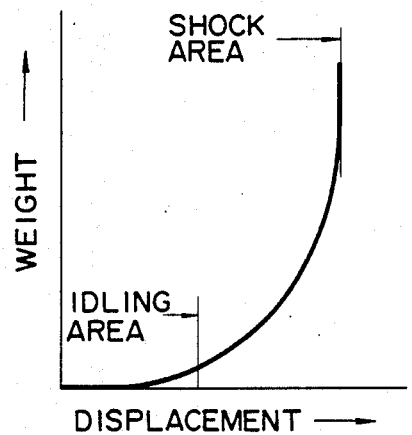
FIG. 1 is a graph showing a characteristic of a prior art shock absorbing member.
Figure 2:
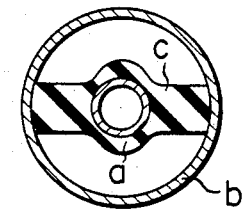
FIG. 2 is a sectional view showing the construction of a prior art shock absorbing member.
Figure 3:
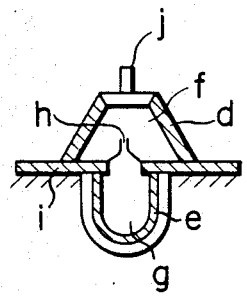
FIG. 3 is a sectional view showing a prior art shock absorber of a liquid sealed type.
Figure 4:
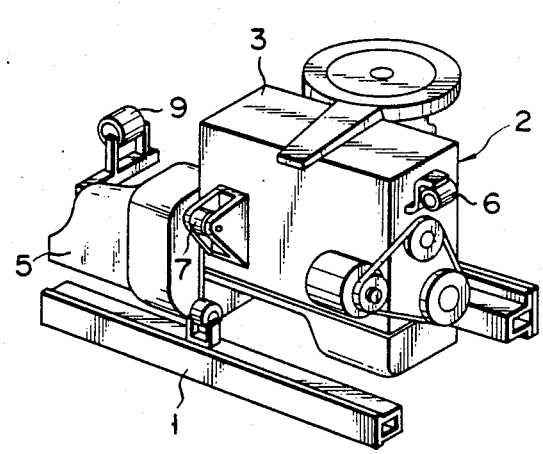
FIG. 4 is a perspective view showing an embodiment of the shock absorbing apparatus according to the invention.
Figure 5:
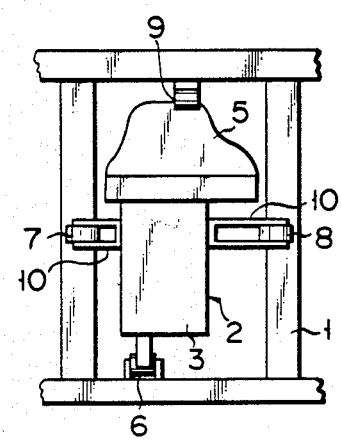
FIG. 5 is a plan view showing an embodiment of the shock absorbing apparatus according to the invention.

An embodiment of the present invention will be described with reference to the accompanying drawings. FIG. 5 shows a state wherein a power device 2 is mounted on a body frame 1. In FIG. 5, the power device 2 comprises an engine 3 and an automatic transmission 5. The engine 3 is supported by first and second shock absorbing apparatuses 7 and 8, an engine mount 6 and a transmission mount 9.

Figure 6:
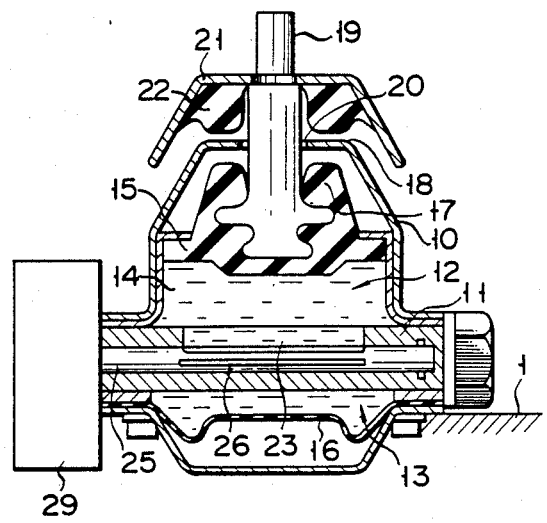
FIG. 6 is a sectional view showing an embodiment of the shock absorbing apparatus according to the invention.
Figure 7:
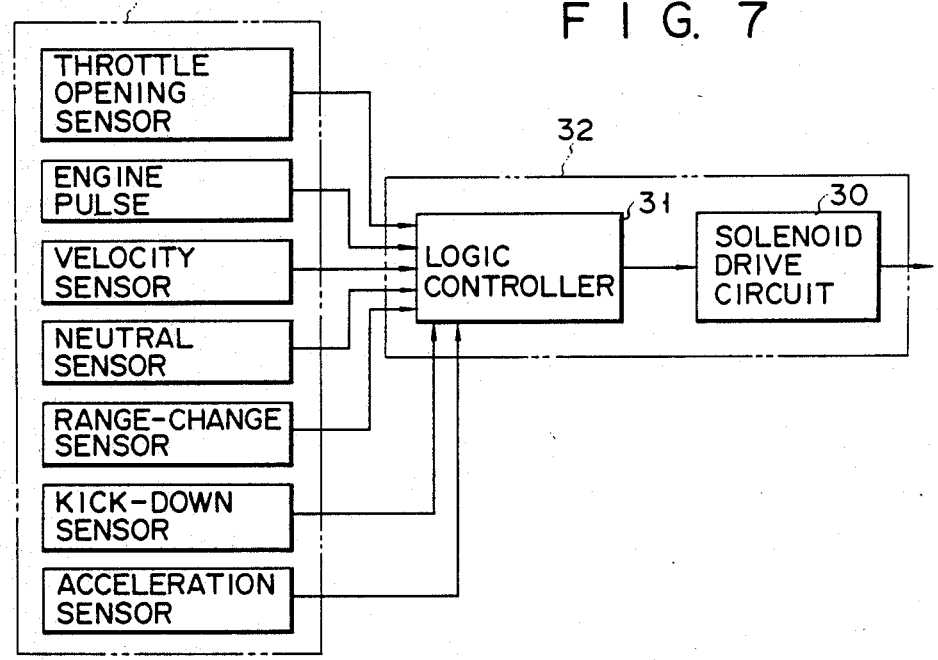
FIG. 7 is a block diagram showing a control circuit for controlling an embodiment of the shock absorbing apparatus according to the invention.
Figure 8:
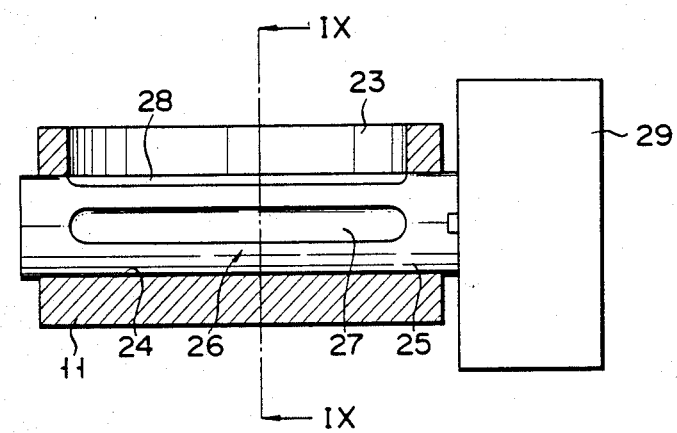
FIG. 8 is a sectional view showing the relation between the orifice and rotary spool in an embodiment of the invention.

The first and second shock absorbing apparatuses 7 and 8 have the same construction and are exemplified by one of them with reference to FIGS. 6 to 10. Referring to FIG. 6, reference numeral 10 denotes a casing mounted on the body frame 1. The casing 10 is partitioned by a partition plate 11 into an upper liquid chamber 12 and a lower liquid chamber 13. Liquid 14 is stored in the upper and lower liquid chambers 12 and 13. The liquid 14 is sealed between an elastic body, such as a rubber member 15, in the upper liquid chamber 12 and a diaphragm 16 in the lower liquid chamber 13. A rubber stopper 17 is integrally formed with the rubber member 15 so as to oppose a ceiling portion 18 of the casing 10. The rubber stopper 17 controls the upward displacement of the rubber member 15. A pin 19 extends upward from the rubber member 15. The pin 19 extends through a through hole 20 formed in the ceiling portion 18 of the casing 10 and is fixed on the power device 2. A cover 21 is mounted on the distal end portion of the pin 19. A rubber stopper 22 is adhered to the lower surface of the cover 21 to oppose the ceiling portion 18 and to control the displacement of the cover 21.

An orifice 23 comprising an elongated hole is formed in the partition plate 11 along the direction corresponding to the thickness of the partition plate 11, so as to cause the upper liquid chamber 12 to communicate with the lower liquid chamber 13. The orifice 23 has a crank-like sectional shape, as shown in FIGS. 8 and 9A to 9C. A bearing hole 24 is formed in a bent portion of the orifice 23 along the longitudinal direction of the plate 11. A rotary spool 25 is rotatably inserted in the bearing hole 24. A valve portion 26 is formed in the shaft of the rotary spool 25 to open/close the orifice 23. The valve portion 26 is constituted by an L-shaped large channel 27 and a small channel 28 communicating therewith. Openings of the large and small channels 27 and 28 are formed on the outer surface of the shaft of the rotary spool 25 at angurar intervals of 90 degrees, so as to selectively oppose the orifice 23. The orifice 23 is controlled by the valve portion 26 to be in one of the closed, partially opened, and fully opened states. One of the ends of the rotary spool 25 extends outward from the corresponding end of the partition plate 11 and is connected to a drive source such as a rotary solenoid 29. The rotary solenoid 29 is electrically connected to sensors 33 through a control circuit 32 having a solenoid drive circuit 30 and a logic controller 31. These sensors detect whether or not there is the possibility of a torque reaction and a torque reaction force, if any. The control circuit 32 controls the rotary solenoid 29 in accordance with the magnitude of the detection signal (torque reaction force), so that the opening of the orifice 23 of the partition plate 11 is controlled.

Figure 9A:
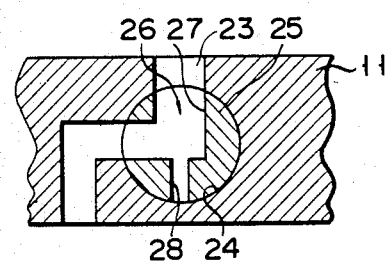
FIGS. 9A to 9C are sectional views taken along the line IX—IX in FIG. 8.

While the engine is idling or rotating at high speed, or while the vehicle is traveling at constant speed, a large torque will not be generated. In this case, the rotary solenoid 29 cannot function. The rotary spool 25 is therefore held in the initial state as shown in FIG. 9A, and the orifice 23 communicates with the large channel 27. Therefore, vibrations transmitted from the power device 2 to the pin 19 are absorbed by the rubber member 15. When the rubber member 15 is deformed downward, the liquid 14 in the upper liquid chamber 12 is guided into the lower liquid chamber 13 through the orifice 23. However, when the rubber member 15 is deformed upward, the liquid 14 in the lower chamber 13 flows into the upper liquid chamber 12 through the orifice 23. Therefore, the vibrations acting on the pin 19, are not absorbed when the liquid 14 flows through the orifice 23. As a result, the vibrations are not transmitted to the body frame 1 through the casing 10.

Figure 9B:
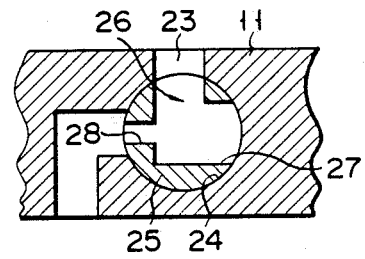
Figure 9C:
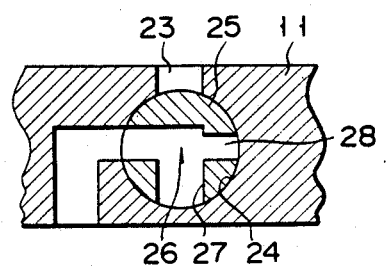

When a shock (low-frequency and large-magnitude vibration) occurs (i.e., when an automatic gear change is made by the automatic transmission 5), a large reaction force against a large torque is generated. The large reaction force is detected by the sensors 33. The sensors 33 supply detection signals to the control circuit 32. The control circuit 32 controls the rotary solenoid 29 to rotate the spool 25, so that the orifice 23 causes the upper and lower liquid chambers 12 and 13 to communicate with each other through the small channel 28, as shown in FIG. 9B. Therefore, the vibration, transmitted from the power device 2 to the pin 19, is transmited to the rubber member 15. The rubber member 15 is greatly deformed so that the liquid 14 in the upper liquid chamber 12 flows through the small channel 28.

Figure 10:
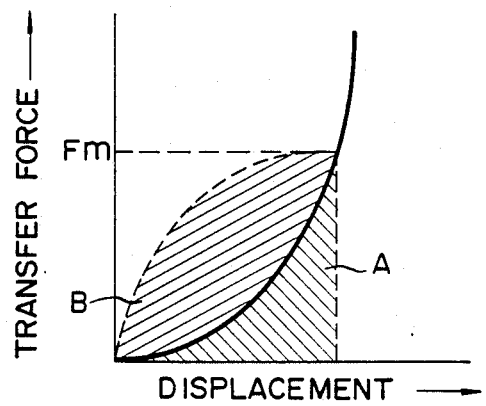
FIG. 10 is a graph showing the relation between the transfer force and displacmenet.

Vibration energy, to be transmitted to transferred from the power device 2 to the body frame 1, can be absorbed by an absorbancy A of the rubber member 15, and a damping force B near the orifice 23, as shown in FIG. 10. As a result, the rollings of the power device 2 are decreased.

Figure 11A:
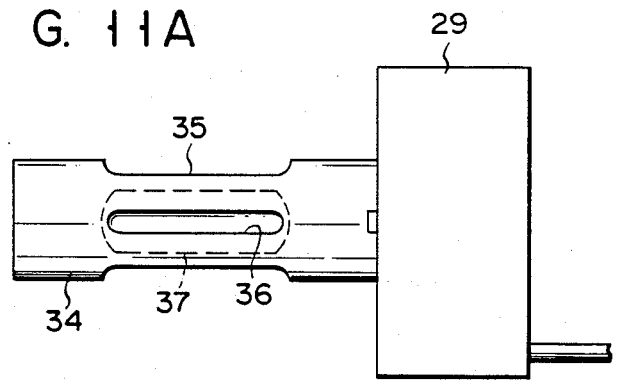
FIGS. 11A and 11B are sectional views showing another embodiment of the rotary spool.
Figure 11B:
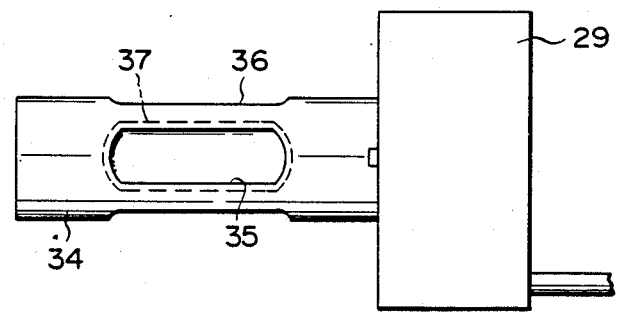
Figure 14A:
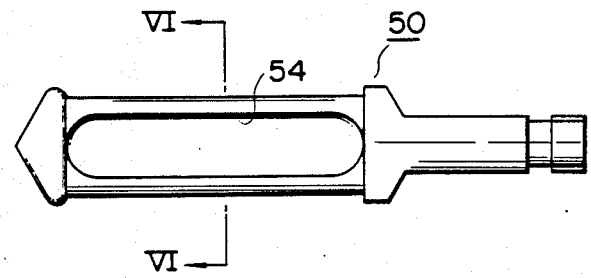
FIG. 14A is a plan view showing the rotary valve of FIG. 13.
Figure 14B:
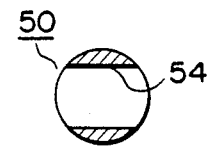
FIG. 14B is a sectional view taken along the line VI—VI in FIG. 14A.

In the embodiment described above, the crank-like orifice 23 is fomred in the partition plate 11. The L-shaped large channel 27 and the small channel 28 communicating therewith constitute the valve portion 26 formed in the rotary spool 25. However, the present invention is not limited to the above construction. For example, as shown in FIGS. 11A and 11B, a wide channel 35 and a narrow channel 36 which are perpendicular to each other can be formed in the shaft of a rotary spool 34. In this case, the rotary spool 34 can be rotated through 90 degrees to change the opening of an orifice 37.

With the embodiment described above, the damping force is varied according to the magnitude of the torque of the power device 2, so that it it possible to reliably present the rolling of the power device 2 with respect to the frame body to prevent the striking of the power device 2 against the walls of the engine room and other components. When there is no change in the reaction against the engine torque, the shock absorbing apparatuses 7 and 8 are not operated. In this case, the vibrations of the power device 2, which is supported by the rubber engine mount 6 and transmission mount 9, are absorbed by these mounts 6 and 9 and are not transmitted to the vehicle body to ensure high comfortability.

Another embodiment of the invention will now be described with reference to FIGS. 12 through 15. The first and second shock absorbers 7 and 8 have the same construction, so only one of them will be described in detail with reference to FIGS. 12 through 15. FIG. 12 is an elevational sectional view of a shock absorber 7 or 8. Referring to the figure, the shock absorber comprises a partitioning disc 41 which divides the interior of the shock absorber into two sections, i.e., upper and lower oil chambers 42 and 43. The partitioning disc 41 is secured to the vehicle chassis 1 (FIG. 5). Mounting screws 44 and 45 are mounted in the walls of the upper and lower oil chambers 42 and 43 facing the partitioning disc 41. They are secured to an arm member 10 extending from the engine body 3. The walls of the upper and lower oil chambers 42, 43, in which the stems of the mounting screws 44 and 45 are mounted, also define upper and lower flexing chambers 46 and 47, respectively. The upper oil chamber 42 is defined between the partitioning disc 41 and upper flexing chamber 46, and the lower oil chamber 43 is defined between the partitioning disc 41 and lower flexing chamber 47. The partitioning disc 41 has a diametrical bore 48 in which a rotary valve 50 is received. The bore 48 consists of a large diameter section 49 and a small diameter section 52. The rotary valve 50 has a large diameter portion with a pointed end which is received in the large diameter section 49 of the bore 48. A small diameter portion 53 of the rotary valve 50 slidably penetrates the samll diameter section 52 of the bore 48. The large diameter portion 53 of the rotary valve 50 is formed with an elongated communication hole 54 having a large opening area and extending in the diametrical direction of the partitioning disc 41. The free end of the small diameter portion 53 of the rotary valve 50 is coupled to a solenoid 55. The rotary valve 50 can be rotated by 90° about its axis by the solenoid 55. The left end of the bore 48 is sealed by a cap 56 provided with an O-ring 57. The partitioning disc 41 has a large hole which is adapted to register with the communication hole 54 of the rotary valve 50. It also has a small hole 58. Orifice elbows 60 and 61, each having an orifice 59 of a constant sectional area and a constant length, are screwed in the upper and lower ends of the hole 58. The walls of the upper and lower flexing chambers 46 and 47 are provided on the side opposite the respective stopper plates 62 and 63. These walls have rubber protuberances 64. The rubber protuberances 64 on each flexing chamber wall consist of opposite-end rubber protuberances 61-1 having a relatively large height. Three intermediate rubber protuberances 64-2 having a relatively small height are provided at a uniform interval between the opposite-end rubber protuberances 64-1.

The rotary valve 50, solenoid 55, hole 58 and orifice elbows 60 and 61 constitute the orifice mechanism.

Figure 15:
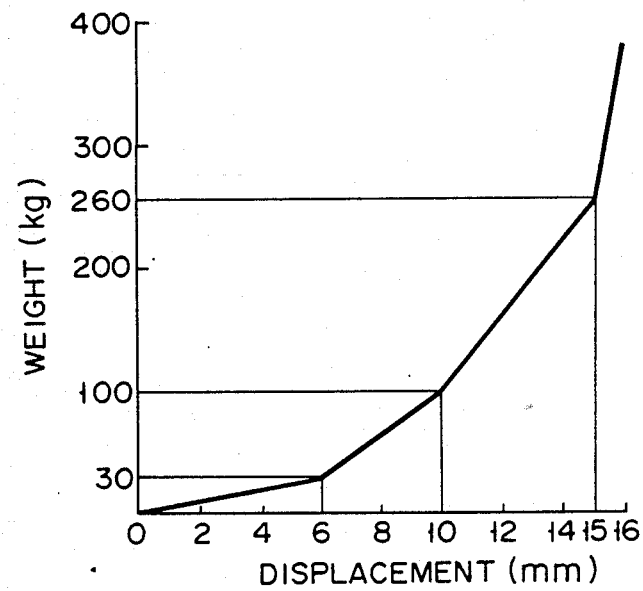
FIG. 15 is a graph showing a spring characteristic representing the load on the flexing chamber shown in FIG. 12 and displacement thereof.

The operation of the embodiment of the invention having the above embodiment will now be described. When the vehicle is running at a constant speed, the engine does not roll. Without any rolling, the communication hole 54 in the rotary valve 50 is vertical, that is, the upper and lower oil chambers 42 and 43 communicate with each other via the communication hole 54 in synchronization with the hole in the partitioning disc 41 which has a relatively large area. In this situation, vibrations of the engine body 3 in the vertical direction, are lightly damped through the mounting screws 44 and 45, the upper and lower flexing chambers 46 and 47, and the upper and lower oil chambers 42 and 43 before being transmitted to the vehicle chassis 1. When the amplitude of the vertical vibration of the engine body 3 is gradually increased, the rubber protuberances 64-1 first strike and are then compressed by stopper plates 62 and 63. With a further increase of the engine body vibration amplitude, the rubber protuberances 64-2 are compressed. FIG. 15 shows the displacement of the upper and lower flexing chambers 46 and 47. The slope of the curve shown increases progressively. It will be seen that a great increase of the load on the upper and lower flexing chambers 46 and 247 can be absorbed with only a comparatively small amount of displacement.

When the accelerator pedal is being depressed at a rate in excess of a predetermined rate to increase the engine throttle valve aperture, the engine body 3 tends to roll due to the reaction against its torque. When the accelerator pedal depression rate exceeds a predetermined rate, the solenoid 55 is energized to cause the rotary valve 50 to rotate 90°. As a result, communication between the upper and lower oil chambers 42 and 43 by the rotary valve 50 is blocked. That is, the upper and lower oil chambers 42 and 43 can only communicate via the orifice 59. In this state, the rolling of the engine body 3 is greatly damped. When the amplitude of the rolling is large, the rubber protuberances 64 will help dampen the rolling.

The rolling of the engine body 3 is damped several seconds after it has been started. Accordingly, the rotary valve 50 is rotated 90° to the initial position several seconds afterwards. The upper and lower oil chambers 42 and 43 can thus again communicate with each other via the communication hole 54 of the rotary valve 50.

Now, vibrations of the engine body 3 are lightly damped by the shock absorbers 7 and 8 before being transmitted to the vehicle chassis 1.

With the shock absorbers as described above, in the absence of the rolling of the engine body 3, the vibrations thereof in the vertical direction are substantially absorbed by the elastic deformation of the engine mount 6, the transmission mount 9, the upper and lower flexing chambers 46 and 47, and the rubber protuberances 64 so that they are barely transmitted to the vehicle chassis 1. On the other hand, any rolling of the engine body 3 is heavily damped by the resistance offered to the fluid in the fluid path of the orifice 59, thus preventing the engine body 3 from striking other vehicle components in the engine room or the vehicle chassis. In addition, pitching of the vehicle body due to the rolling of the engine body 3 can be prevented. Further, since the displacement of the engine body 3 is minimized, the displacement of piping extending from the engine body 3, such as the exhaust pipe, the cooling water duct, and the fuel duct, can also be minimized which is advantageous from the standpoint of effectively utilizing engine room space.

While in the above embodiment of orifice elbows 60 and 61 are provided, it is also possible to construct a rotary valve 50 which is also provided with an orifice corresponding to the orifice 59 so that it can block the communication between the upper and lower oil chambers 42 and 43 via the communication hole 54 while maintaining the communication with the orifice when engine body rolling causes the rotary valve 50 to rotate.

The provision of the orifice elbows 60 and 61 on the partitioning disc 41, however, facilitates the selection of the diameter and length of the orifice, and permits the desired orifice characteristics to be readily obtained while permitting machining expenditures to be reduced.

Further, the cap 56 may be dispensed with and instead, the left and of the rotary valve 50 in FIG. 12 may be sealed to the bore 48 with an O-ring. However, with the arrangement of the above embodiment, in which the bore 48 is sealed with the cap 56 and the rotary valve 50 has a conically pointed end facing the cap 56, the rotary valve 50 may be reduced in size and weight to facilitate its positioning and to ensure its light and smooth movement.

What is claimed is:

1. An engine shock absorbing apparatus comprising:
   a casing containing a liquid;
   a partitioning member having an opening therein along its length fastened to said casing and to one of either an engine or an automotive body, thus dividing the inside of said casing into two chambers; said opening extending along a majority of said partitioning member length;
   elastic walls provided on a wall section of both chambers for varying the capacity of said chambers by elastic deformation of said elastic wall;
   a mounting member which is fixed to the other side of an engine or an automotive body and so supported on the elastic wall of one of said both liquid chambers as to be changed in position relative to said partitioning member;
   an elastic stopper which is fitted to one side of either said mounting member or partitioning member outside of said liquid chambers, and is so designed as to contact the other side of said mounting member or partitioning member when said elastic wall is displaced beyond a predetermined extent;

a variable orifice device which is inserted into said partitioning member so as to rotate around the axis of said partitioning member separating said both liquid chambers from each other, is provided with a communication passage for effecting the communication between both liquid chambers, and is designed to vary the manner in which both liquid chambers communicate with each other in accordance with the angle of rotation of said orifice device; said communication passage having an oblate cross section whose axis is parallel to the axis of said variable orifice device and whose length is coextensive with said opening whereby free communication is allowed between said chambers when said communication passage and said opening are aligned;

rotary drive means which is set outside of said casing, and controls the angle at which said rotary valve is turned, thereby adjusting the opened extent of said variable orifice device;

roll-detecting means for detecting the rolling tendency of the engine; and a control circuit which is electrically connected to said rotary drive means and roll detecting means and sends forth a control signal to said rotary drive means in accordance with the contents of a signal delivered from said roll-detecting means.

2. The engine shock absorbing apparatus according to claim 1, wherein said roll-detecting means is intended to detect whether the accelerator is depressed or released at a higher speed than predetermined; and, when said acceleration is depressed or released at a higher speed than predetermined value, sends forth a control signal to said rotary drive means in order to reduce the opened state of said variable orifice device in a predetermined period.

3. The engine shock absorbing apparatus according to claim 1, wherein said rotary valve is represented by a rotary spool valve, which is provided with said communication passage and an orifice having a smaller cross-sectional area than said communication passage, and is further so designed as to let said communication passage and orifice to selectively communicate with said both liquid chambers.

4. The engine shock absorbing apparatus according to claim 1, wherein said variable orifice device further comprises a fixed orifice formed in said partitioning member so as to effect the constant communication between both liquid chambers with a smaller cross-sectional area than said communication passage; and said rotary valve is so designed as to prevent both liquid chambers from communicating with each other by said communication passage.

5. An engine shock absorbing apparatus according to claim 1, wherein an end of an insertion hole formed in said partitioning member for the insertion of said rotary valve is sealed liquid tight by a cap and a projection which abuts against said cap is formed on said rotary valve.

6. An engine shock absorbing apparatus according to claim 1, wherein said elastic wall faces said partitioning member, and said elastic stopper is an elastic projection provided such that it abuts against said mounting member from the displacement of said elastic wall above a specified amount and is formed integrally with said elastic wall on the outside surface of said elastic wall and is supported by said casing.

7. An engine shock absorbing apparatus according to claim 6, wherein said elastic projection comprises a plurality of projections having different heights.

* * * * *

UNITED STATES PATENT AND TRADEMARK OFFICE
CERTIFICATE OF CORRECTION

PATENT NO. : 4,700,933
DATED : October 20, 1987
INVENTOR(S) : S. Chikamori et al.

It is certified that error appears in the above-identified patent and that said Letters Patent is hereby corrected as shown below:

Title page:

In the Heading, under [30] Foreign Application Priority Data, change "58-36222" to --58-36222(U)--

Signed and Sealed this

Seventeenth Day of May, 1988

Attest:

DONALD J. QUIGG

Attesting Officer

Commissioner of Patents and Trademarks